United States Patent Office 2,837,541
Patented June 3, 1958

---

2,837,541

IMPROVED PROCESS FOR PREPARING 9α-FLUORO-Δ$^{1,4}$-3,20-DIKETO - 11β,17α - DIHYDROXY-21-ACYLOXY-PREGNADIENE

Ralph F. Hirschmann, Westfield, and Richard Miller, New Brunswick, N. J., assignors to Merck & Co., Inc., Rahway, N. J., a corporation of New Jersey No Drawing. Application May 26, 1955
Serial No. 511,403

6 Claims. (Cl. 260—397.45)

This invention is concerned generally with novel processes for preparing steriod compounds. More particularly, it relates to an improved dehydrobromination method for preparing 9α-fluoro-Δ$^{1,4}$-3,20-diketo - 11β,17α - dihydroxy-21-acyloxy-pregnadiene compounds from the corresponding 2,4-dibromo-9α-fluoro-3,20-diketo-11β,17α-dihydroxy-21-acyloxy-allopregnane. The 9α-fluoro-Δ$^{1,4}$-3,20-diketo-11β,17α-dihydroxy - 21 - acyloxy-pregnadienes obtained in accordance with this improved method possess extremely high cortisone activity and, in addition, are relatively free of the sodium and water retention action characteristic of cortisone, hydrocortisone, and 9α-fluoro-hydrocortisone.

Heretofore, 9α-fluoro-Δ$^{1,4}$-3,20-diketo - 11β,17α - dihydroxy-21-acyloxy-pregnadienes have been prepared by reacting 2,4-dibromo-9α-fluoro-3,20-diketo-11β,17α-dihydroxy-21-acyloxy-allopregnane with other dehydrohalogenating agents such as 2,4-dinitrophenylhydrazine, but the dehydrobrominated products obtained by this prior method have been impure and the yields of the desired 9α-fluoro-Δ$^{1,4}$-3,20-diketo-11β,17α-dihydroxy - 21 - acyloxy-pregnadiene have been low.

It is now discovered that relatively high yields of 9α-fluoro-Δ$^{1,4}$-3,20-diketo-11β,17α-dihydroxy - 21 - acyloxy-pregnadienes can be obtained by dehydrobromination of a crude dibromide comprising 2,4-dibromo-9α-fluoro-3,20-diketo-11β,17α-dihydroxy - 21 - acyloxy-allopregnanes providing the reaction is conducted in a medium comprising an N,N-dialkylacyl amide. This process may be chemically represented as follows:

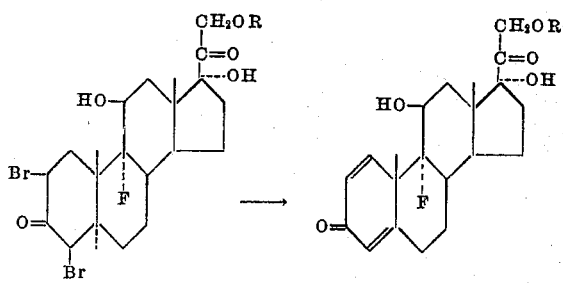

wherein R is an acyl radical.

In carrying out this improved method, the 2,4-dibromo-9α-fluoro-3,20-diketo - 11β,17α - dihydroxy-21-acyloxy-allopregnane is heated with the N,N-dialkylacylamide as for example an N,N-dialkyl-formamide such as dimethylformamide, diethylformamide, and the like, at an elevated temperature. The reaction is ordinarily conducted at a temperature within the range of approximately 100–150° C., although higher or lower reaction temperatures may be utilized if desired; the reaction is conveniently carried out under reflux, under which conditions the reaction is usually complete in about 1–2 hours. While the N,N-dialkyl-acylamide can be employed as the sole dehydrobrominating agent, it is preferred to employ a mixture of said N,N-dialkyl-acylamide and a tertiary amine, such as collidine, dimethylaniline, and the like; using my preferred dehydrobromination mixture comprising about five parts of dimethylformamide and two parts of collidine to one part of 2,4-dibromo-9α-fluoro-3,20-diketo-11β,17α-dihydroxy - 21 - acyloxy-allopregnane, and conducting the reaction by heating these components together under reflux, the dehydrobromination reaction is ordinarily complete in about 1½ hours. The 9α-fluoro-Δ$^{1,4}$-3,20-diketo-11β,17α-dihydroxy - 21 - acyloxy-pregnadiene is conveniently recovered from the reaction mixture by mixing the latter with a dilute aqueous acid solution and a water-immiscible organic solvent as for example a halogenated hydrocarbon solvent such as chloroform, dichloromethane, and the like; the tertiary amine and N,N-dialkyl-acylamide remain in the aqueous layer and the dehydrobrominated steroid reaction product is extracted into the halogenated hydrocarbon solvent layer, and is recovered therefrom by evaporating the solvent. The residual material thus obtained may be purified by chromatography over alumina to give the desired 9α-fluoro-Δ$^{1,4}$-3,20-diketo-11β,17α-dihydroxy - 21 - acyloxy-pregnadiene compound in substantially pure form. In accordance with this method and utilizing, as the 2,4-dibromo-9α-fluoro - 3,20 - diketo-11β,17α-dihydroxy-21-acyloxy-allopregnane starting materials, 2,4-dibromo-9α-fluoro - 3,20 - diketo-11β,17α,21-trihydroxy-allopregnane-21-alkanoate, 2,4-dibromo - 9α - fluoro - 3,20 - diketo-11β,17α,21-trihydroxy-allopregnane 21-acetate, 2,4-dibromo-9α-fluoro - 3,20 - diketo-11β,17α,21-trihydroxy-allopregnane 21-propionate, 2,4-dibromo-9α-fluoro-3,20-diketo - 11β,17α,21 - trihydroxy-allopregnane 21-benzoate, and the like, there are obtained 9α-fluoro-Δ$^{1,4}$-3,20-diketo-11β,17α-dihydroxy-21-acyloxy-pregnadienes such as 9α-fluoro-Δ$^{1,4}$-3,20-diketo - 11β,17α,21 - trihydroxy-pregnadiene 21-alkanoate, 9α-fluoro-Δ$^{1,4}$-3,20-diketo-11β,17α,21-trihydroxy-pregnadiene 21-acetate, 9α-fluoro-Δ$^{1,4}$-3,20-diketo-11β,17α,21-trihydroxy-pregnadiene 21 - propionate, 9α-fluoro-Δ$^{1,4}$-3,20-diketo - 11β,17α,21 - trihydroxy-pregnadiene 21-benzoate, and the like.

The following examples illustrate methods of carrying out the present invention but it is to be understood that these examples are given for purposes of illustration and not of limitation.

*Example 1*

Approximately one gram of 2,4 - dibromo-9α-fluoro-3,20 - diketo - 11β,17α-dihydroxy-21-acetoxy-allopregnane is mixed with 2 cc. of collidine and 5 cc. of dimethylformamide, and the mixture is heated under reflux for a period of about 100 minutes. The reaction mixture is cooled and distributed between dichloromethane and dilute aqueous hydrochloric acid solution. The dichloromethane layer is washed with dilute aqueous hydrochloric acid solution and then with water until neutral and free of dimethylformamide. The washed dichloromethane layer is then evaporated in vacuo, and the residual material is purified chromatographically to give substantially pure 9α - fluoro - Δ$^{1,4}$-3,20 - diketo - 11β, 17α - dihydroxy-21-acetoxy - pregnadiene; M. P. 237° C.; [α]$_D$+100.9° in acetone.

*Example 2*

Eight grams of 2,4 - dibromo - 9α - fluoro - 3,20-diketo-11β,17α - dihydroxy - 21 - acetoxy - allopregnane is mixed with 18 cc. of collidine and 45 cc. of dimethylformamide, and the mixture is heated under reflux for a period of about 100 minutes. The reaction mixture is cooled and distributed between chloroform and 2.5 N aqueous hydrochloric acid solution. The chloroform layer is washed with dilute aqueous hydrochloric acid solution, with 5% aqueous sodium bicarbonate solution, and then with water until neutral and free of dimethylformamide.

The solvent is evaporated from the washed chloroform layer in vacuo to give 6.19 g. of crude $\Delta^{1,4}$-9α-fluoro-3,20-diketo - 11β,17α - dihydroxy - 21 - acetoxy-pregnadiene. 6.15 g. of this crude $\Delta^{1,4}$-9α-fluoro-3,20-diketo-11β,17α-dihydroxy-21-acetoxy-pregnadiene is dissolved in 135 cc. of 2 : 1 benzene : chloroform mixture, and the resulting solution passed through a column of 258 g. of neutral alumina. The resulting adsorbate is eluted with chloroform, the chloroform eluate is evaporated to dryness in vacuo, and the residual material is recrystallized from acetone to give substantially pure $\Delta^{1,4}$ - 9α - fluoro-3,20-diketo - 11β,17α - dihydroxy - 21 - acetoxy - pregnadiene; M. P. 236° C.

The 2,4 - dibromo - 9α - fluoro - 3,20 - diketo-11β,17α-dihydroxy-21-acetoxy-allopregnane used as starting material in Examples 1 and 2 may be prepared starting with 9α-fluoro-hydrocortisone acetate ($\Delta^4$-9α - fluoro- 3,20-diketo - 11β,17α - dihydroxy - 21 - acetoxy - pregnene) as follows: 12.0 g. of 5% palladium on charcoal catalyst are added to a suspension of 14.5 g. of said $\Delta^4$-9α-fluoro-3,20 - diketo - 11β,17α,21-trihydroxy-pregnene 21-acetate in 1500 cc. of methanol, and the mixture is reacted with hydrogen at atmospheric pressure while maintaining the reactants at about room temperature. The absorption of hydrogen ceases after about 15 minutes; the amount of hydrogen absorbed corresponds to one mole. The reaction mixture is filtered, thereby removing the catalyst, and the catalyst is washed thoroughly with methanol. The filtrate and washings are combined, and the resulting solution is evaporated to dryness in vacuo. The residual material is then recrystallized twice from acetone to give about 8 grams of substantially pure 9α - fluoro - 3,20-diketo - 11β,17α - dihydroxy - 21 - acetoxy-allopregnane. Eight grams of 9α - fluoro - 3,20 - diketo - 11β,17α-dihydroxy - 21-acetoxy-allopregnane is dissolved in 280 cc. of glacial acetic acid, and to this solution is added 2.0 cc. of an 0.95 N solution of hydrogen bromide in glacial acetic acid. To this solution is added a glacial acetic acid solution containing two molecular equivalents of bromine (based on the steroid compound) and, after the uptake of bromine is complete, an additional 50 cc. of the 0.95 N solution of hydrogen bromide in glacial acetic acid is added. The resulting solution is maintained at room temperature for a period of approximately 2½ hours. The reaction mixture is poured into water, and the precipitated material is recovered by filtration and dried to give 2,4 - dibromo - 9α - fluoro - 3,20 - diketo-11β,17α-dihydroxy-21-acetoxy-allopregnane.

Various changes and modifications may be made in carrying out the present invention without departing from the spirit and scope thereof. Insofar as these changes and modifications are within the purview of the annexed claims, they are to be considered as part of our invention.

We claim:
1. In the process of dehydrobrominating 2,4-dibromo-9α - fluoro - 3,20 - diketo - 11β,17α - dihydroxy - 21-lower alkanoyloxy-allopregnane to produce 9α - fluoro-$\Delta^{1,4}$-3,20 - diketo - 11β,17α - dihydroxy - 21 - lower alkanoyloxy-pregnadiene, the improvement which comprises conducting said dehydrobromination in the presence of an N,N-dialkyl-acylamide.

2. In the process of dehydrobrominating 2,4-dibromo-9α - fluoro - 3,20 - diketo - 11β,17α - dihydroxy - 21-lower alkanoyloxy-allopregnane to produce 9α-fluoro-$\Delta^{1,4}$-3,20-diketo - 11β,17α - dihydroxy - 21 - lower alkanoyloxy-pregnadiene, the improvement which comprises conducting said dehydrobromination in the presence of an N,N-dialkyl-formamide.

3. In the process of dehydrobrominating 2,4 - dibromo-9α - fluoro - 3,20 - diketo - 11β,17α,21 - trihydroxy-allopregnane 21-acetate to produce 9α - fluoro-$\Delta^{1,4}$-3,20-diketo - 11β,17α,21 - trihydroxy-pregnadiene 21 - acetate, the improvement which comprises conducting said dehydrobromination in the presence of dimethylformamide.

4. The process which comprises reacting a 2,4 - dibromo - 9α - fluoro - 3,20 - diketo - 11β,17α - dihydroxy-21-acyloxy-allopregnane with a tertiary amine in the presence of an N,N-dialkyl-acylamide thereby forming the corresponding 9α - fluoro-$\Delta^{1,4}$-3,20 - diketo - 11β,17α-dihydroxy - 21 - acyloxy-pregnadiene in substantially enhanced yield.

5. The process which comprises reacting 2,4 - dibromo-9α - fluoro - 3,20 - diketo - 11β,17α,21-trihydroxy-allopregnane 21-acetate with collidine in the presence of dimethylformamide thereby forming 9α - fluoro-$\Delta^{1,4}$-3,20-diketo - 11β,17α,21 - trihydroxy-pregnadiene 21-acetate in substantially enhanced yield.

6. In the process of dehydrobrominating a crude dibromide comprising 2,4 - dibromo - 9α - fluoro - 3,20-diketo - 11β,17α - dihydroxy - 21 - lower alkanoyloxy-allopregnane to produce 9α - fluoro-$\Delta^{1,4}$-3,20 - diketo-11β,17α - dihydroxy - 21-lower alkanoyloxy-pregnadiene, the improvement which comprises conducting said dehydrobromination in the presence of an N,N-dialkyl-acylamide.

References Cited in the file of this patent
UNITED STATES PATENTS

| | | |
|---|---|---|
| 2,703,799 | Bergstrom | Mar. 8, 1955 |
| 2,707,190 | Farrar | Apr. 26, 1955 |
| 2,735,855 | Djerassi | Feb. 21, 1956 |
| 2,736,681 | Tishler | Feb. 28, 1956 |

OTHER REFERENCES
Fried, Jour. Am. Chemical Soc. 75, 2273 (1953).
Fried, Jour. Am. Chemical Soc. 76, 1455–6 (1954).